United States Patent [19]

Katsube et al.

[11] Patent Number: 5,267,232
[45] Date of Patent: Nov. 30, 1993

[54] METHOD OF CONTROLLING DATA TRANSMISSION IN ATM NETWORK WITH CELL LOSS PRIORITY LEVEL

[75] Inventors: Yasuhiro Katsube; Hiroshi Esaki; Toshikazu Kodama, all of Kanagawa, Japan

[73] Assignee: Kabushiki Kaisha Toshiba, Tokyo, Japan

[21] Appl. No.: 753,363

[22] Filed: Aug. 30, 1991

[30] Foreign Application Priority Data

Aug. 31, 1990 [JP] Japan .................................. 2-231549

[51] Int. Cl.$^5$ ........................... H04J 3/14; H04M 3/22
[52] U.S. Cl. ...................................... 370/17; 370/85.6; 370/94.1
[58] Field of Search .................... 370/13, 14, 17, 54, 370/58.1, 58.2, 58.3, 60, 60.1, 85.6, 94.1; 340/825.06, 825.5, 825.51; 371/5.1, 5.5

[56] References Cited

U.S. PATENT DOCUMENTS

| | | | |
|---|---|---|---|
| 4,484,326 | 11/1984 | Turner | 370/94.1 |
| 4,984,264 | 1/1991 | Katsube | 370/54 |
| 5,042,027 | 8/1991 | Takase et al. | 370/60 |
| 5,062,106 | 10/1991 | Yamazaki et al. | 370/85.6 |
| 5,067,123 | 11/1991 | Hyodo et al. | 370/60 |
| 5,119,367 | 6/1992 | Kawakatsu et al. | 370/60 |
| 5,130,978 | 7/1992 | Mobasser | 370/60 |

OTHER PUBLICATIONS

International Switching Symposium, vol. 5, Jun. 1990, New York, pp. 21-26, T. Koinuma et al, "An ATM Switching System Based On a Distributed Control Architecture".

IEEE Global Telecommunications Conference and Exhibition, vol. 1, Dec. 1988, New York, pp. 203-207, G. M. Woodruff et al, "A Congestion Control Framework For High-Speed Integrated Packetized Transport".

G. Gallassi et al., Bandwidth Assignment in Prioritized ATM Networks, Globecom '90, vol. 2 pp. 852-856, Dec. 1990.

*Primary Examiner*—Douglas W. Olms
*Assistant Examiner*—Alpus H. Hsu
*Attorney, Agent, or Firm*—Oblon, Spivak, McClelland, Maier & Neustadt

[57] ABSTRACT

A method of controlling data transmission in the ATM network which establishes simple modes of a network control for a case in which a plurality of cell loss priority levels are involved within the cells of a single virtual channel. The method includes the steps of declaring the traffic characteristics for either the loss intolerable cells only, or the loss intolerable cells and the loss tolerable cells separately, and carrying out at the network a connection admission control by estimating a cell loss rate on a basis of the declared traffic characteristics, such that the cell loss rate for either the loss intolerable cells only, or the loss intolerable cells and the loss tolerable cells separately in the multiplexed virtual channels is secured by the network on a basis of the estimated cell loss rate.

11 Claims, 12 Drawing Sheets

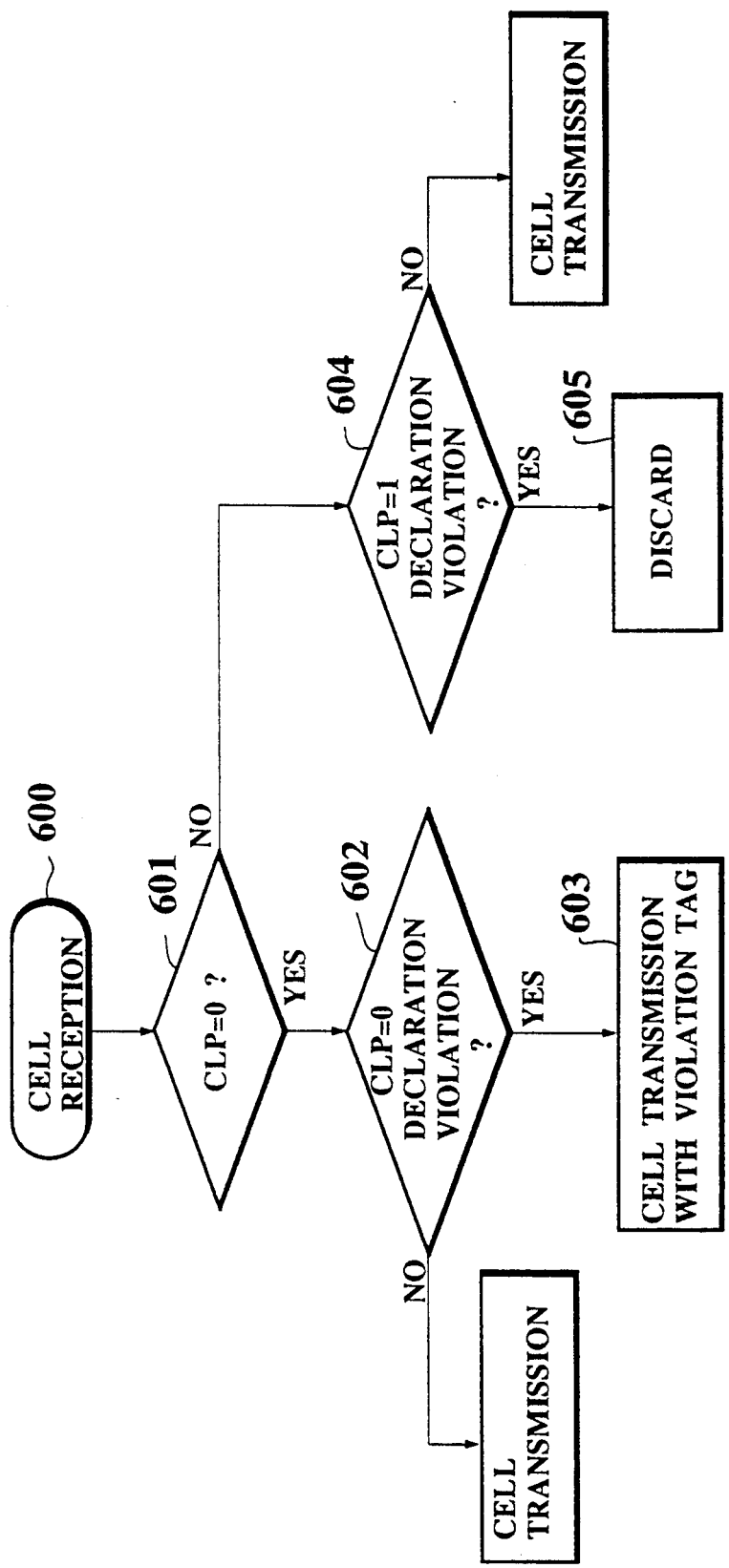

METHOD OF CONTROLLING DATA TRANSMISSION IN ATM NETWORK WITH CELL LOSS PRIORITY LEVEL

BACKGROUND OF THE INVENTION

1. Field of the Invention

The present invention relates to a method of controlling cell loss rates for data transmission in ATM (asynchronous transfer mode) network.

2. Description of the Background Art

In the ATM network, the information generated at each terminal is transmitted in units of fixed length packets called cells. In transmitting the cells, the request connections from the terminals are admitted to the network by such a number that an arithmetic sum of the maximum cell transmission speeds of the terminals can be greater than the bandwidth of the physical transmission lines, by taking the statistical multiplexing effect into account. Thus, the arithmetic sum of the cell transmission speeds of the terminals exceeds the bandwidth of the physical transmission lines at some probability, and therefore there is a possibility for the cells transmitted from the terminals to be discarded at some probability. Namely, in the ATM network, up to a certain level of overloading of the cells can be handled without discarding any cell at all by utilizing the buffering function of the network, but when the cells to be transmitted exceeds the buffer capacity, the buffer overflow occurs and some cells are discarded.

Now, in the ATM network, the management of he bandwidth for transmitting the cells is carried out by taking the statistical multiplexing effect into account. Namely, when each terminal makes a connection set up request to the network, the terminal also makes a request for a quality of service concerning the cell loss rate at least, and the network in response carries out the so called connection admission control in which the admission or rejection of the requested connection set up is determined according to a judgement as to whether it is possible to satisfy the requested quality of service by admitting this connection set up. In order to carry out this connection admission control accurately, it is necessary to make an estimation for the cell loss rate as accurately as possible for the sake of achieving more efficient network performance, and to be an over-estimation for the sake of securing the safety in the network operation. In other words, in the ATM network, the communication resource (bandwidth) is shared by a plurality of virtual channels by allowing the cell loss up to a certain cell loss rate, in order to improve the efficiency of the network performance.

Moreover, in the ATM network, it is possible for the network to distinguish those cells for which the cell loss is not tolerable at all and those cells for which the cell loss up to a certain level of the cell loss rate is tolerable, by specifying an explicit indication of the priority level regarding the cell loss in the CLP (cell loss priority) field provided in the ATM header of the cell to be transmitted from the terminal to the network. In this case, when the need for discarding some cells arises because of congestion, the network starts discarding the cells with the lower priority level first. Thus, in this case, two types of cells with two different cell loss priority levels are mixed within a single virtual channel, and the network needs to carry out the cell loss priority control for these two types of cells, along with the usual connection admission control for securing the quality of service.

However, a method of quality of service control regarding the cell loss for a case in which a plurality of priority levels are involved within a single virtual channel has not been established yet.

Moreover, in the ATM network, the following two conditions must be satisfied in a case of using the CLP field in the ATM header.

(1) The quality of service regarding the cell loss for each virtual channel requested by the terminal must be secured.

(2) In a case of discarding cells, the network must secure that it starts discarding the cells with the lower priority level (loss tolerable cells) first, before discarding any cell with the higher priority level (loss intolerable cell).

The condition (2) is required obviously because otherwise the priority level specified in each cell loses any significance at all.

As for the condition (1), when two types of loss tolerable cells and loss intolerable cells are present among the cells of a single virtual channel and these two types of cells are controlled according to the condition (2), it is inevitable that the actual cell loss rate for the loss tolerable cells and the actual cell loss rate for the loss intolerable cells turn out to be different even within a single virtual channel. Thus, it is necessary to establish exactly what should be secured by the network and what should be requested by the terminal as the quality of service concerning the cell loss for each virtual channel, and to devise an algorithm for the connection admission control capable of securing the quality of service regarding the cell loss.

On the other hand, it is also necessary for the network to monitor whether the traffic characteristics declared by each terminal at a time of the connection set up request is faithfully maintained or not, and to regulate the cell flow in a case there is a violation. This operation of the network is called a usage parameter control. Here, it is necessary to establish how this usage parameter control should be carried out with respect to the two types of the cells with two different cell loss priority levels.

Furthermore, when the a plurality of cell groups (virtual channels) containing the loss tolerable cells and loss intolerable cells at different ratio share the same communication resource, the network does not recognize the individual virtual channel, so that in discarding the cells, all the loss tolerable cells are discarded uniformly, regardless of which virtual channel they belong to. As a consequence, the virtual channels containing more loss tolerable cells may end up losing more cells, such that the total cell loss rate becomes much larger for these virtual channels than for the other virtual channels. In other words, in such a case, it is impossible to secure the total cell loss rate for each virtual channel.

SUMMARY OF THE INVENTION

It is therefore an object of the present invention to provide a method of controlling data transmission in the ATM network which establishes simple modes of a network control for a case in which a plurality of cell loss priority levels are involved within the cells of a single virtual channel.

According to one aspect of the present invention there is provided a method of controlling data transmission in an ATM network, in which data are transmitted in units of cells, a group of cells are transmitted from a terminal to the network by setting up a virtual channel, and a plurality of virtual channels are multiplexed at the network, comprising the steps of: providing a cell loss priority field in each cell to be transmitted with a cell loss priority level at a terminal; declaring from the terminal to the network a traffic characteristic for loss intolerable cells with a higher cell loss priority level in each virtual channel to be set up at a time of a connection set up request; and carrying out at the network a connection admission control by estimating a cell loss rate for the loss intolerable cells on a basis of the traffic characteristic declared at the declaring step, such that only the cell loss rate for the loss intolerable cells in the multiplexed virtual channels is secured by the network on a basis of the estimated cell loss rate for the loss intolerable cells.

According to another aspect of the present invention there is provided a method of controlling data transmission in an ATM network, in which data are transmitted in units of cells, a group of cells are transmitted from a terminal to the network by setting up a virtual channel, and a plurality of virtual channels are multiplexed at the network, comprising the steps of: providing a cell loss priority field in each cell to be transmitted with a cell loss priority level at a terminal; declaring from the terminal to the network traffic characteristics for loss intolerable cells with a higher cell loss priority level and loss tolerable cells with a lower cell loss priority level in each virtual channel to be set up at a time of a connection set up request; and carrying out at the network a connection admission control by estimating cell loss rates for the loss intolerable cells and the loss tolerable cells separately on a basis of the declared traffic characteristics, such that the cell loss rates for the loss intolerable cells and the loss tolerable cells in the multiplexed virtual channels are secured separately by the network on a basis of the estimated cell loss rates for the loss intolerable cells and the loss tolerable cells.

According to another aspect of the present invention there is provided a method of controlling data transmission in an ATM network, in which data are transmitted in units of cells, a group of cells are transmitted from a terminal to the network by setting up a virtual channel, and a plurality of virtual channels are multiplexed at the network, comprising the steps of: providing a cell loss priority field in each cell to be transmitted with a cell loss priority level at a terminal; declaring from the terminal to the network a ratio of numbers of loss intolerable cells with a higher cell loss priority level and loss tolerable cells with a lower cell loss priority level in each virtual channel to be set up at a time of a connection set up request; classifying at the network the virtual channels into a plurality of virtual channel classes according to the ratio declared at the declaring step; dividing at the network a communication resource into a plurality of sub-resources in correspondence with the plurality of the virtual channel classes; and carrying out at the network a connection admission control for each of the virtual channel classes classified at the classifying step separately.

Other features and advantages of the present invention will become apparent from the following description taken in conjunction with the accompanying drawings.

DETAILED DESCRIPTION OF THE PREFERRED EMBODIMENTS

First, the cell loss priority in the ATM network will be described in general.

Figure 1:
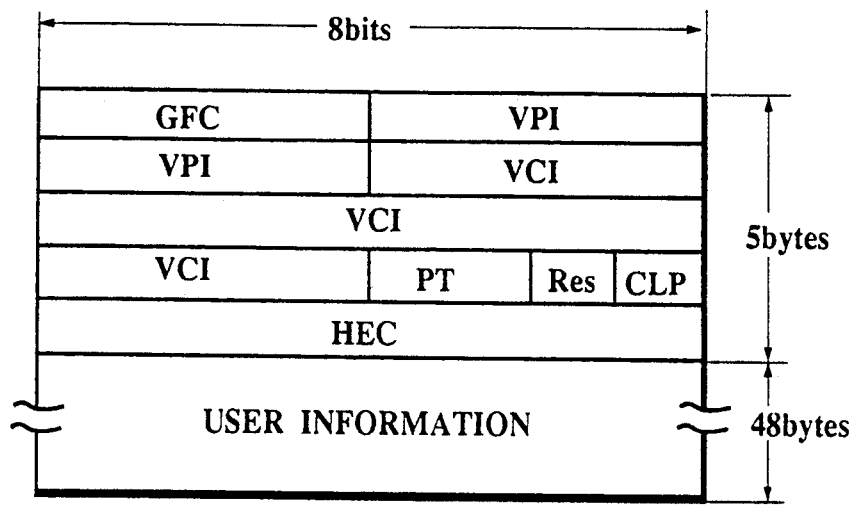
FIG. 1 is a diagram of an ATM cell format used by the method of controlling data transmission in an ATM network according to the present invention.

In the ATM network, each ATM cell at a user network interface has a format shown in FIG. 1, which includes 5 bytes of a header field and 48 bytes of an information field.

In this ATM cell of FIG. 1, GFC field is a region for a flow control, VPI field is a region for a virtual path identification, VCI field is a region for a virtual channel identification, PT field is a region for a payload type used in distinguishing user data and network data in the data section, HEC field is a region for a header error control, Res field is a reserved region, and CLP field is a region for indicating a cell loss priority.

In transmitting such an ATM cell from the terminal, the cell loss priorities can be specified explicitly by manipulating a bit of the CLP field in each cell. Namely, the bit value of the CLP field is set to 1 for the loss tolerable cell which has a lower cell loss priority level, and 0 for the loss intolerable cell which has a higher cell loss priority level.

Figure 2:
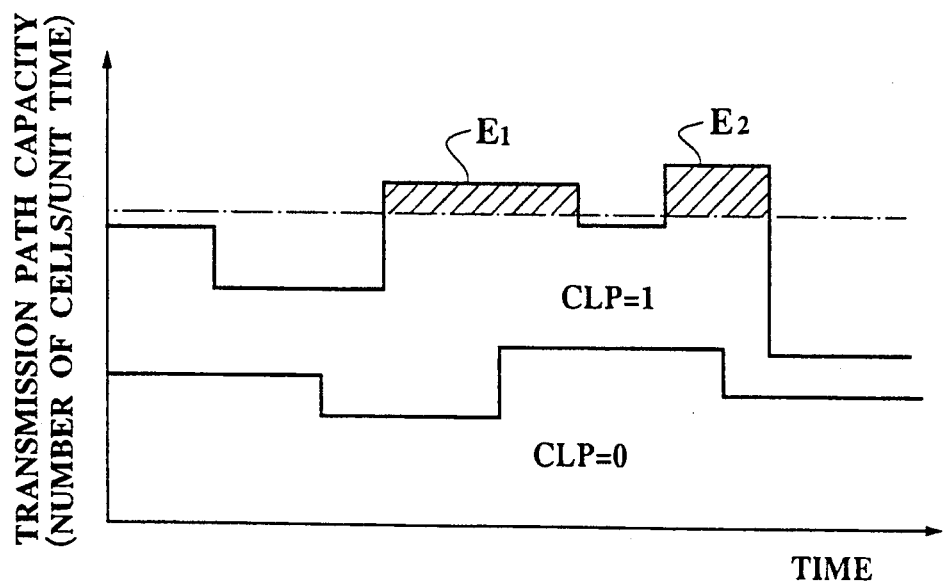
FIG. 2 is a diagram of a typical loading state for a transmission path arising in the method of controlling data transmission in an ATM network according to the present invention.

Now, in the ATM network, a loading state (a state of cell arrival) for a multiplexed transmission path changes in time as shown in FIG. 2, which shows a typical example.

As shown in FIG. 2, usually a plurality of virtual channels are multiplexed in the transmission path, while the generation of the cells for each virtual channel fluctuate in time in general, so that the state of cell arrival in the transmission path in which the virtual channels are multiplexed is also changing in time.

Moreover, when the cells of each virtual channel transmitted from each terminal include the loss intolerable cells (CLP=0) and the loss tolerable cells (CLP=1), the multiplexed cells of a plurality of virtual channels arriving at the transmission path can also be classified into the cells with CLP=0 and the cells with CLP=1, as shown in FIG. 2.

In FIG. 2, shaded regions $E_1$ and $E_2$ are those at which a number of cells arriving at the transmission path per unit time exceeded the capacity of the multiplexed transmission path. The cells of these regions $E_1$ and $E_2$ are either stored by a queueing buffer at a node until the capacity becomes available again or discarded as a result of a buffer overflow.

This queueing buffer is to be controlled such that, in a case of discarding cells, the cells with the lower priority level (loss tolerable cells) are discarded first, before discarding any cell with the higher priority level (loss intolerable cell).

Figure 3:
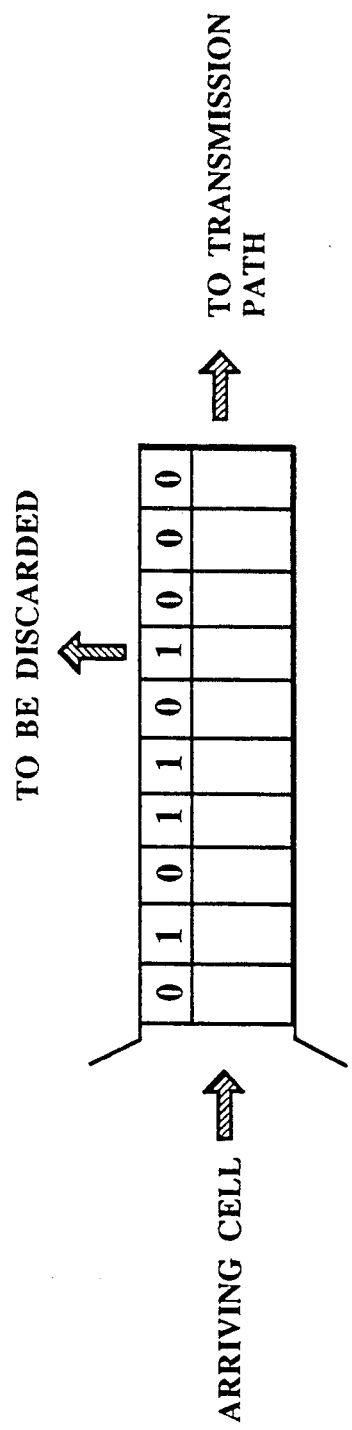
FIG. 3 is a diagram of one type of a queueing buffer control used in the method of controlling data transmission in an ATM network according to the present invention.

For example, as shown in FIG. 3, in a case of the buffer overflow, the CLP fields of the cells stored in the queueing buffer are checked to pick out the loss tolerable cells to be discarded first. This manner of controlling the queueing buffer is called a pushout scheme.

Figure 4:
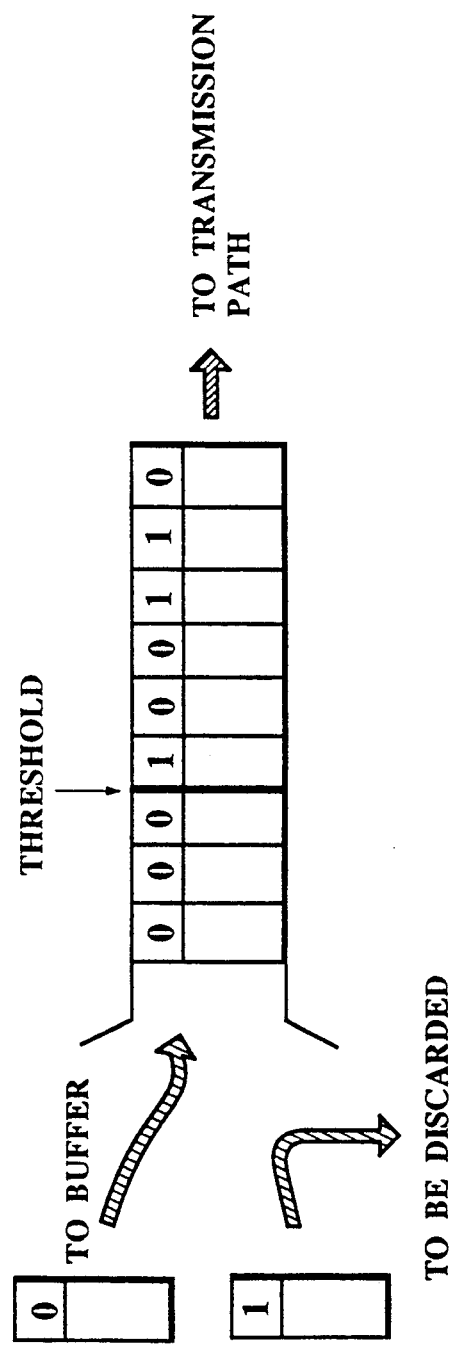
FIG. 4 is a diagram of another type of a queueing buffer control used in the method of controlling data transmission in an ATM network according to the present invention.

Alternatively, as shown in FIG. 4, a threshold smaller than the full buffer capacity is set up in the queueing buffer, such that when a number of cells stored in the queueing buffer exceeds this threshold, any newly arriving loss tolerable cell is discarded without being admitted into the queueing buffer, while a newly arriving loss intolerable cell is admitted into the queueing buffer up to the full buffer capacity. This manner of controlling the queueing buffer is called a threshold scheme.

By controlling the queueing buffer as shown in FIG. 3 or FIG. 4, the cell loss rate for the loss intolerable cells can be made lower than that for the loss tolerable cells.

Now, the method of controlling data transmission in such an ATM network incorporating the cell loss priority according to the present invention will be described in detail.

First, according to the present invention, the cell loss priority control is carried out for the entire multiplexed cells of a plurality of virtual channels allocated to a single bandwidth as a whole, without recognizing individual virtual channel separately, in order to avoid introducing an excessive complexity into the control algorithm.

Thus, according to the present invention, the network secures the quality of service which can be satisfied for each virtual channel separately without recognizing each virtual channel separately.

As a choice of such an quality of service to be secured by the network, the following two cases can be considered.

(I) A case of securing only the cell loss rate for the loss intolerable cells.

(II) A case of securing the cell loss rate for the loss tolerable cells and the cell loss rate for the loss intolerable cells separately.

The embodiments based on each of these cases will now be described in detail.

First, an embodiment based on a case (I) of securing only the cell loss rate for the loss intolerable cells will be described.

Figure 5:
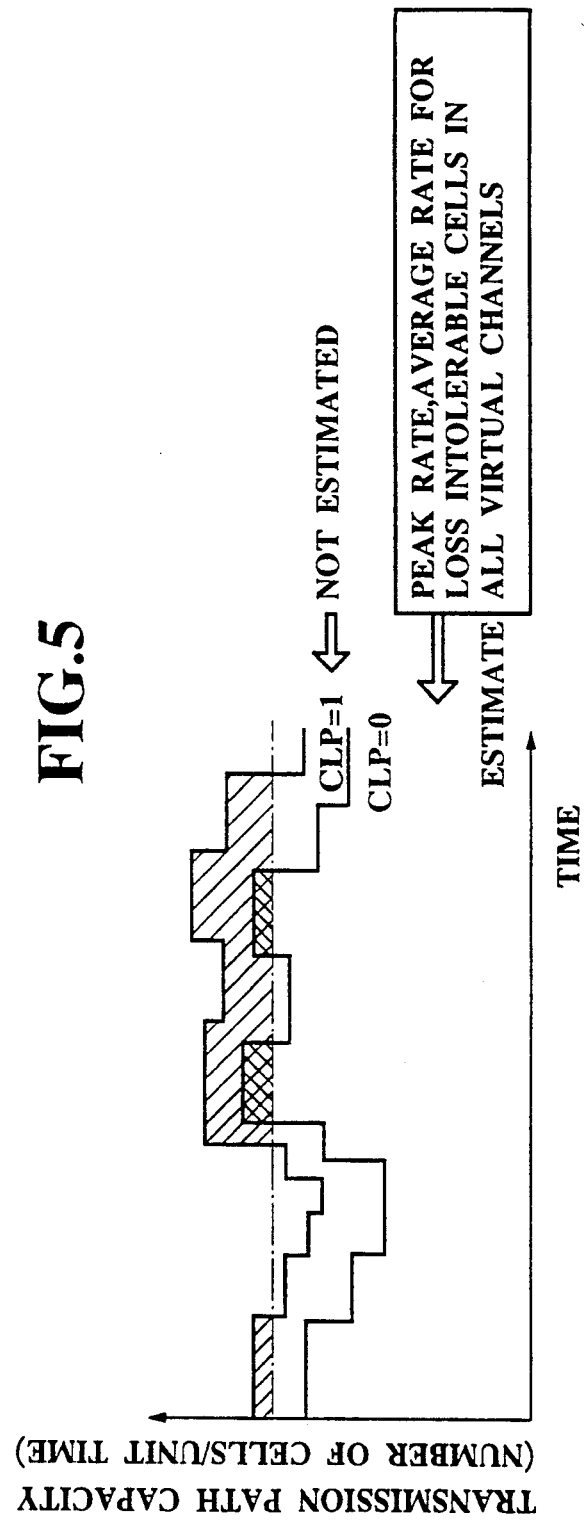
FIG. 5 is a diagram of a typical loading state for a transmission path arising in one particular embodiment of the method of controlling data transmission in an ATM network according to the present invention.

In this case, a loading state (a state of cell arrival) for the multiplexed transmission path changes in time as shown in FIG. 5, which shows a typical example.

At a time of connection set up request, each terminal declares to the network the traffic characteristics (and a level of the cell loss rate) for only the loss intolerable cells (CLP=0) among the cells belonging to the virtual channel to be set up, while not declaring anything for the loss tolerable cells (CLP=1). Therefore, the network can comprehend and manage the traffic for only the loss intolerable cells and does not concern at all about the loss tolerable cells, either for each virtual channel separately or for the multiplexed virtual channels as a whole.

When the network carries out the priority control such as that the threshold scheme shown in FIG. 4, it is possible for the network to carry out the connection set up control which can safely secure the cell loss rate for the loss intolerable cells under the assumption that only the cell intolerable cells can use the buffer area behind the threshold, without concerning the existence of any loss tolerable cell at all.

Consequently, only those data which are hopefully transmitted but not critically important should be transmitted as the loss tolerable cells from each terminal in this case.

For example, when the data to be transmitted are the image data encoded hierarchically into upper bits and lower bits, the upper bits which are critically important should be transmitted as the loss intolerable cells, whereas the lower bits which have less influence on the visual appearance of the image should be transmitted as the loss tolerable cells.

More specifically, as a choice for the traffic characteristics for the loss intolerable cells to be declared by each terminal, there are several candidates including a peak rate such as a minimum cell arrival interval, and an average rate such as a maximum number of arriving cells within a given period of time.

Figure 6:
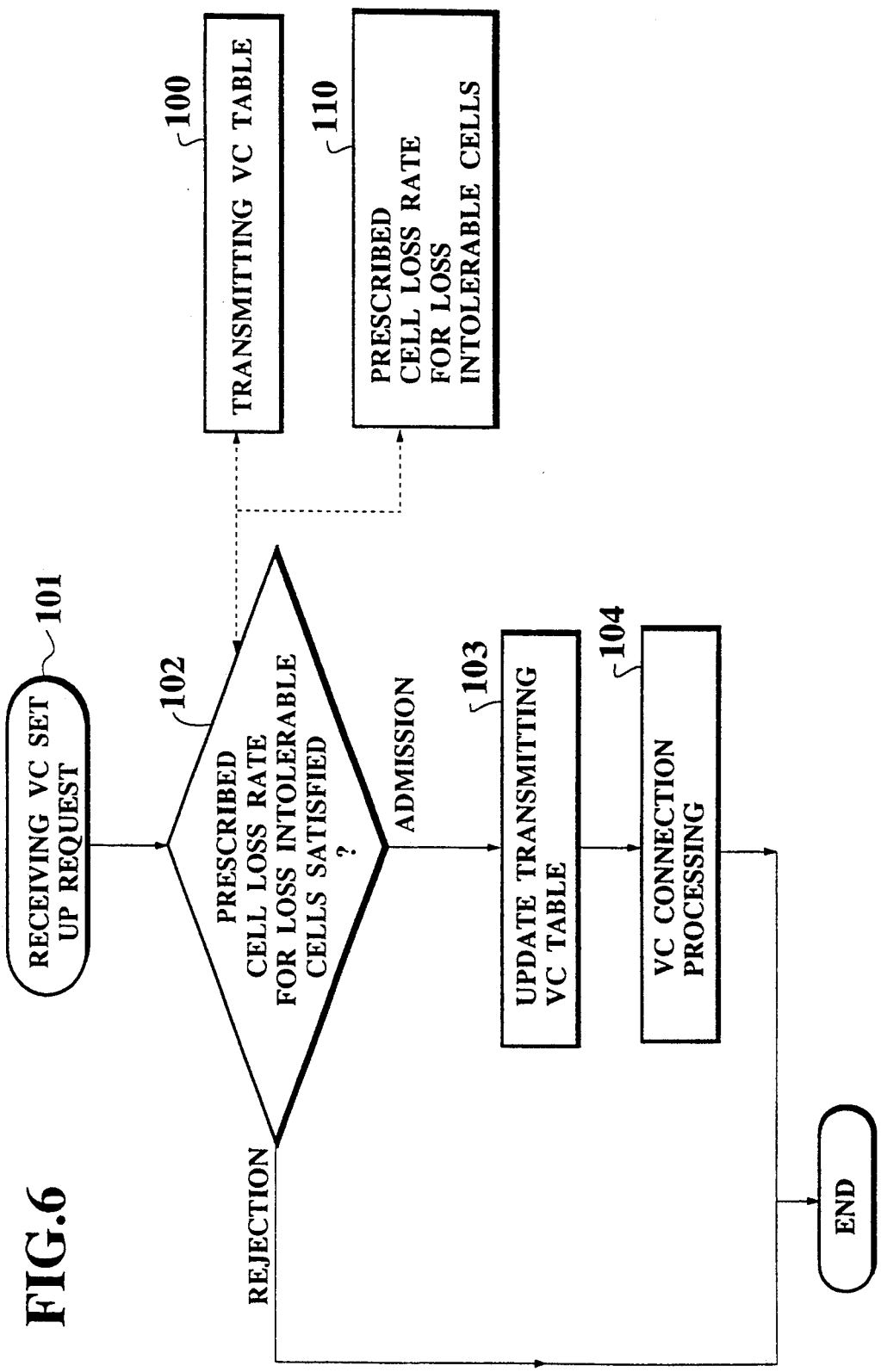
FIG. 6 is a flow chart for a connection admission control in the embodiment related to FIG. 5.

A connection admission control at each ATM exchange node in this case can be carried out according to a flow chart of FIG. 6, as follows.

Namely, at each ATM exchange node, an information concerning currently transmitting virtual channels and the traffic characteristics of the loss intolerable cells belonging to these currently transmitting virtual channels are stored in a form of a transmitting VC table 100 for all the communication resources managed.

Then, at the step 101, the connection admission control is initiated by receiving a VC set up request message containing the traffic characteristics for the loss intolerable cells belonging to the virtual channel to be set up as a declaration parameter.

Next, at the step 102, the admission or rejection of the VC set up request is determined by judging whether the prescribed cell loss rate can be satisfied for the loss intolerable cells of the currently transmitting virtual channels and the virtual channel to be set up in a case of admitting the set up of the virtual channel to be set up requested by the VC set up request, by using the transmitting VC table 100 and the declared information on the traffic characteristic for the loss intolerable cells belonging to the virtual channel to be set up.

Here, this determination of the admission or rejection can be carried out by either one of the following two methods.

(1) Each time the VC set up request is generated, the estimated cell loss rate for the loss intolerable cells of the currently transmitting virtual channels and the virtual channel to be set up are estimated according to the traffic characteristics of the currently transmitting virtual channels and the virtual channel to be set up, and then the estimated cell loss rate so obtained is compared with the prescribed cell loss rate for the loss intolerable cells 110.

(2) An upper limit for a number of virtual channels that can be transmitted simultaneously while satisfying the prescribed cell loss rate is determined in advance by carrying out an approximation calculation, simulation, or experiment, and this upper limit is stored in a form of a connection possible VC table. Then, when the VC set up request is generated, the admission or rejection is determined by comparing the number of virtual channels in the connection possible VC table and the transmitting VC table.

When the requested set up of the virtual channel is admitted at the step 102, the transmitting VC table is updated at the step 103, and the connection processing for the set up of the virtual channel is carried out at the step 104.

Next, an embodiment based on a case (II) of securing the cell loss rate for the loss tolerable cells and the cell loss rate for the loss intolerable cells separately will be described.

Figure 7:
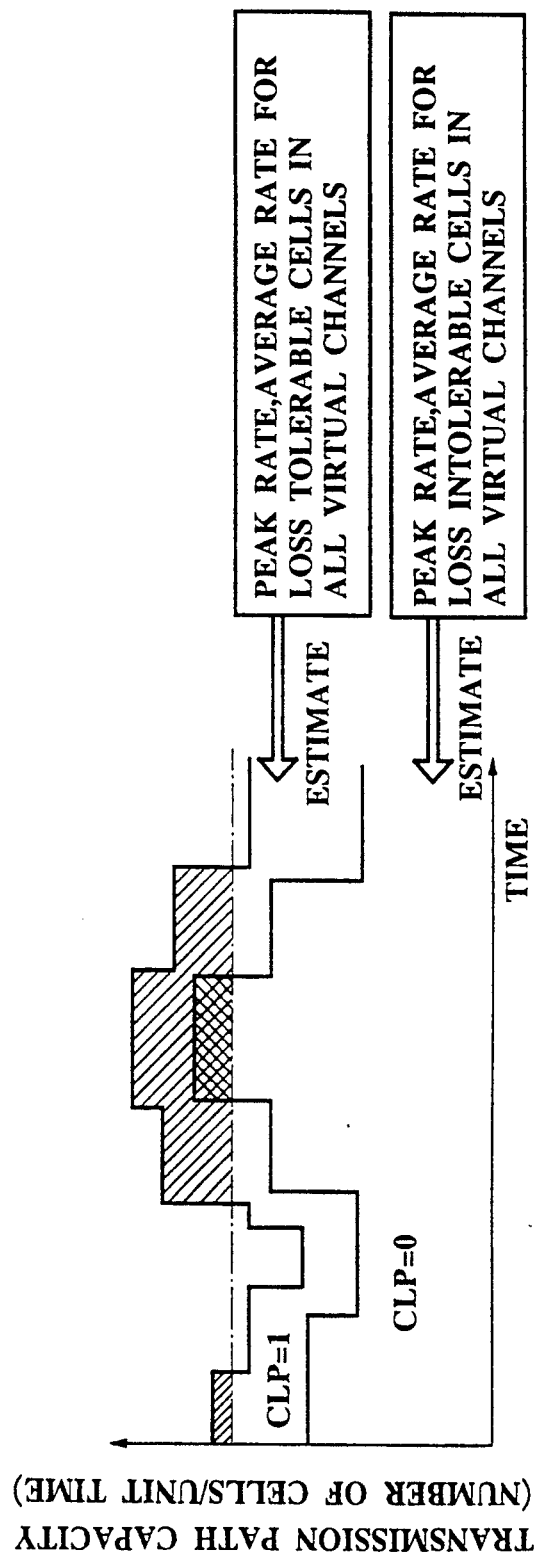
FIG. 7 is a diagram of a typical loading state for a transmission path arising in another particular embodiment of the method of controlling data transmission in an ATM network according to the present invention.
Figure 8:
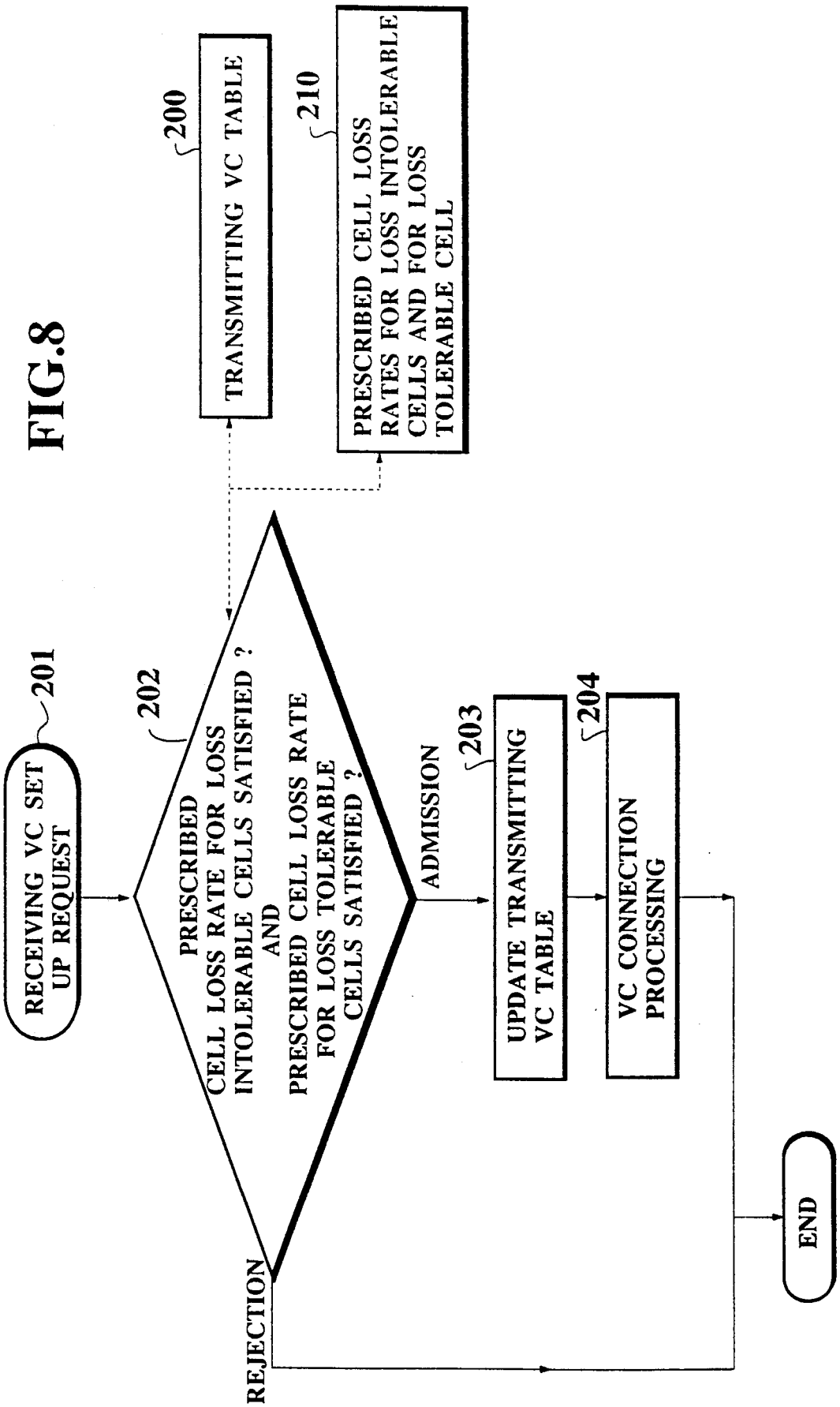
FIG. 8 is a flow chart for a connection admission control in the embodiment related to FIG. 7.

In this case, a loading state (a state of cell arrival) for the multiplexed transmission path changes in time as shown in FIG. 7 which shows a typical example.

At a time of connection set up request, each terminal declares to the network the traffic characteristics (and a level of the cell loss rate) for the loss intolerable cells (CLP=0) belonging to the virtual channel to be set up, as well as the traffic characteristics (and a level of the cell loss rate) for the loss tolerable cells (CLP=1) belonging to the virtual channel to be set up. Therefore, the network can comprehend and manage the traffic for both the loss intolerable cells and the loss tolerable cells, separately.

The network carries out the priority control at the queueing buffer such as that shown in FIG. 3 or FIG. 4, while carrying out the connection admission control which can estimate and secure the cell loss rate for both the loss intolerable cells and the cell tolerable cells separately.

This case (II) is capable of providing the most detailed securing of the quality of service by the network, although the amount of information required for the control becomes larger.

More specifically, as a choice for the traffic characteristic for the loss intolerable cells and the loss tolerable cells to be declared by each terminal, there are several candidates including a peak rate such as a minimum cell arrival interval, and an average rate such as a maximum number of arriving cells within a given period of time.

A connection admission control at each ATM exchange node in this case can be carried out according to a flow chart of FIG. 10, as follows.

Namely, at each ATM exchange node, an information concerning currently transmitting virtual channels and the traffic characteristics of both the loss intolerable cells and the loss tolerable cells belonging to these currently transmitting virtual channels are stored separately in a form of a transmitting VC table 200 for all the communication resource managed.

Then, at the step 201, the connection admission control is initiated by receiving a VC set up request message containing the traffic characteristics for both the loss intolerable cells and the loss tolerable cells belonging to the virtual channel to be set up separately as declaration parameters.

Next, at the step 202, the admission or rejection of the VC set up request is determined by judging whether the prescribed cell loss rate can be satisfied for both the loss intolerable cells and the loss tolerable cells of the currently transmitting virtual channels and the virtual channel to be set up in a case of admitting the set up of the virtual channel to be set up requested by the VC set up request, by using the transmitting VC table 100 and the declared information on the traffic characteristics for both the loss intolerable cells and loss tolerable cells belonging to the virtual channel to be set up.

Here, this determination of the admission or rejection can be carried out by either one of the following two methods.

(1) Each time the VC set up request is generated, the estimated cell loss rates for both the loss intolerable cells and the loss tolerable cells of the currently transmitting virtual channels and the virtual channel to be set up are estimated separately according to the traffic characteristics of the currently transmitting virtual channels and the virtual channel to be set up, and then the estimated cell loss rates so obtained are compared with the prescribed cell loss rates for the loss intolerable cells and for the loss tolerable cells 210 separately.

(2) Upper limits for a number of virtual channels that can be transmitted simultaneously while satisfying the prescribed cell loss rates for the loss intolerable cells and for the loss tolerable cells are determined separately in advance by carrying out an approximation calculation, simulation, or experiment, and these upper limits are stored in a form of a connection possible VC table. Then, when the VC set up request is generated, the admission or rejection is determined by comparing the number of virtual channels in the connection possible VC table and the transmitting VC table.

When the requested set up of the virtual channel is admitted at the step 202, the transmitting VC table is updated at the step 203, and the connection processing for the set up of the virtual channel is carried out at the step 204.

Now, it is also necessary for the network to monitor whether the traffic characteristics declared by each terminal at a time of the connection set up request is faithfully maintained or not, and to regulate the cell flow in a case there is a violation. Such a usage parameter control in a case involving two types of the cells with two different cell loss priority levels described above will now be described in detail.

Figure 9:
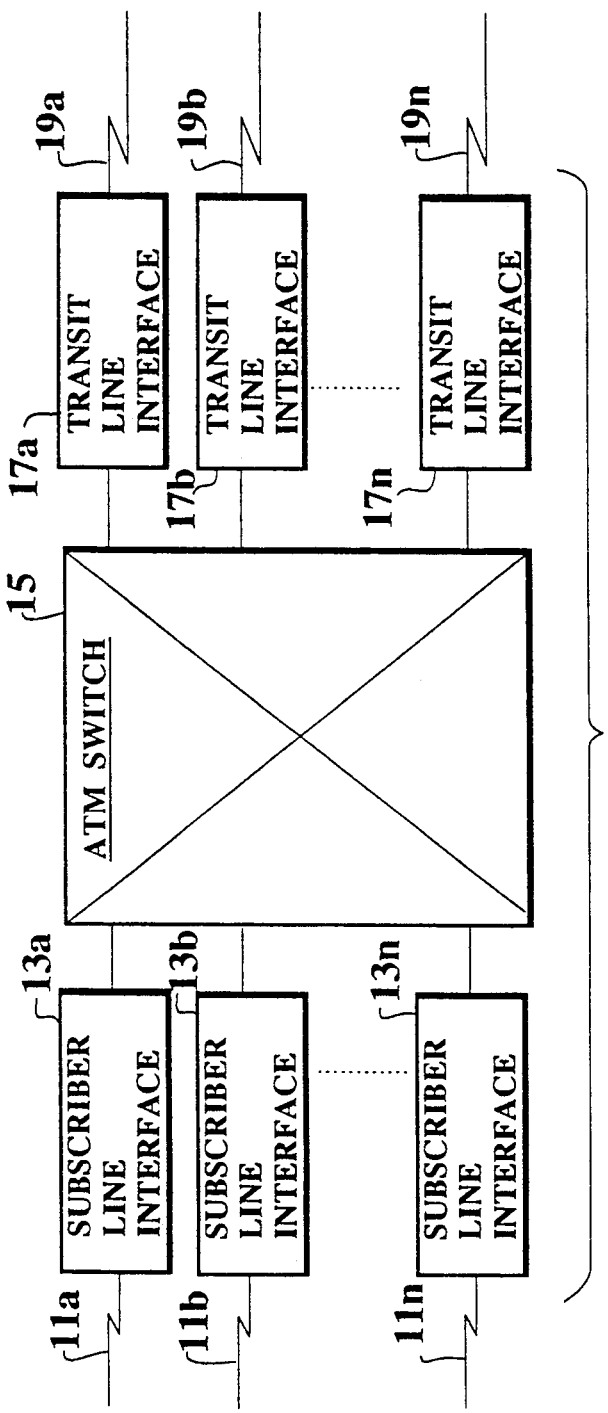
FIG. 9 is a schematic diagram of a configuration of an ATM exchange in an ATM network.

First of all, an ATM network has a configuration schematically shown in FIG. 9, where the ATM exchange includes a plurality of subscriber line interfaces 13a to 13n which are connected to a plurality of subscriber transmission lines 11a to 11n, a plurality of transit line interfaces 17a to 17n which are connected to a plurality of transit transmission lines 19a to 19n, and an ATM switch 15 which transmits cells by hardware. In such a configuration, a subscriber line interface is included only in the subscriber ATM exchange and not in the transit ATM exchange.

In this ATM network, the above mentioned usage parameter control function is provided in the subscriber line interfaces 13a to 13n, which monitors a number of cells in each virtual channel transmitted from the subscriber transmission lines 11a to 11n.

Here, as a choice for a type of cells to be monitored by this usage parameter control function, the following two cases can be considered.

(i) A case of monitoring only the loss intolerable cells.

(ii) A case of monitoring the loss tolerable cells and the loss intolerable cells separately.

The embodiments based on each of these cases will now be described in detail.

First, an embodiment based on a case (i) of monitoring only the loss intolerable cells will be described.

In this case, at a time of connection set up request, each terminal declares to the network the traffic characteristics (and a level of the cell loss rate) for only the loss intolerable cells (CLP=0) among the cells belonging to the virtual channel to be set up, while not declaring anything for the loss tolerable cells (CLP=1). Then, while carrying out the connection admission control which secure the cell loss rate only for the loss intolerable cells, the network also monitors whether the traffic characteristic for the loss intolerable cells for each virtual channel declared by each terminal at a time of the connection set up request is faithfully maintained or not.

When a terminal transmitting the cells by violating the declaration is detected, it must be regulated by the usage parameter control in order to prevent an adverse effect due to this violation on the loss intolerable cells of the other virtual channels which are not violating the declarations.

Such a usage parameter control can be realized by the following three methods.

A first method is to simply discard all the violation cells which are transmitted by violating the declaration. This method is quite simple and therefore practical, but it requires a very accurate algorithm for judging which cells are the violation cells. This is because it is quite undesirable for the network to irretrievably discard the cells which the terminal believes to have transmitted in accordance with the declaration, without any notice.

A second method is to attach a violation tag indicating the violation cell to a field other than CLP, VPI, VCI, and HEC in the ATM cell header section, such as the PT field or the Res field for example, of each violation cell.

Figure 10:
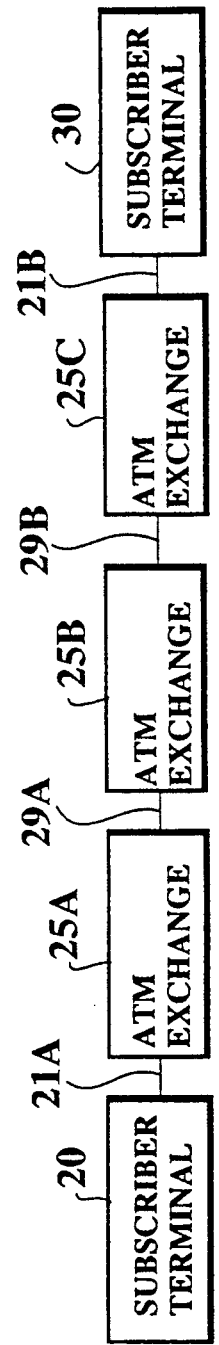
FIG. 10 is a schematic diagram of an exemplary configuration of an ATM network.

For example, this method operates in an exemplary configuration of the ATM network shown in FIG. 10 in which the data are to be transmitted from one subscriber terminal 20 to another subscriber terminal 30 through a subscriber transmission line 21A, an ATM exchange 25A, a transit transmission line 29A, an ATM exchange 25B, a transit transmission line 29B, an ATM exchange 25C, and a subscriber transmission line 21B. The monitoring of the loss intolerable cells in each virtual channel transmitted is carried out by a subscriber line interface of the ATM exchange 25A.

Here, at the subscriber line interface, the violation tags are attached to the PT fields or the Res fields in the ATM cell header sections of those loss intolerable cells which are judged to be the violation cells, and then transmitted to the ATM switch of the ATM exchange 25A.

Then, in a case a need for discarding of the cells arises at any one of the ATM exchanges 25A, 25B, and 25C, the network starts discarding the loss tolerable cells and the loss intolerable cells with the violation tags first, before discarding any non-violation loss intolerable cell, so as to prevent the unfair deterioration of the cell loss rate for the loss intolerable cells without the violation tags. Here, the loss tolerable cells and the violation cells may be treated equally, or may be given the different priority levels.

Figure 11:
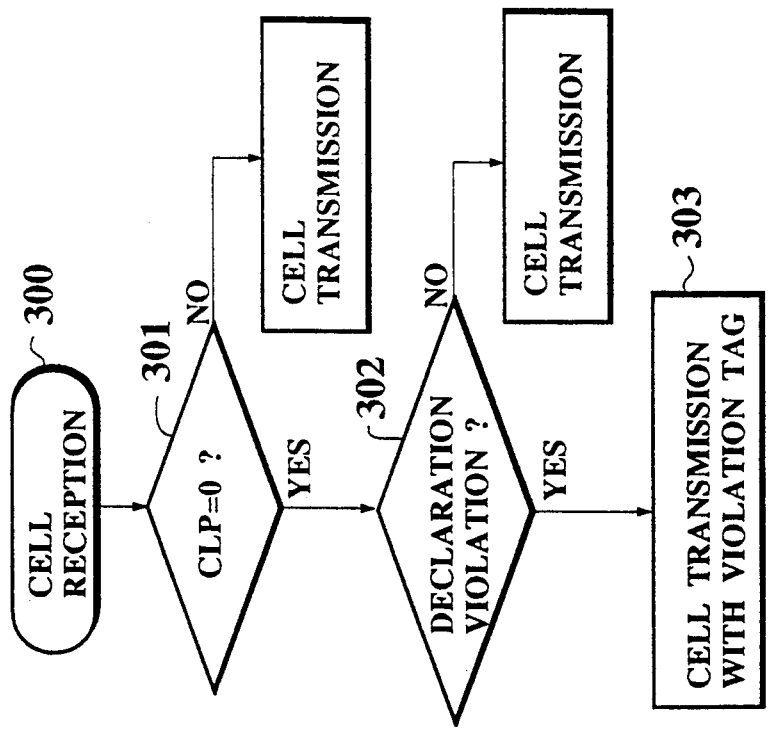
FIGS. 11(A) and 11(B) are flow charts for two embodiments of a method of monitoring declaration violation in one type of the method of controlling data transmission in an ATM network according to the present invention.
Figure 11:
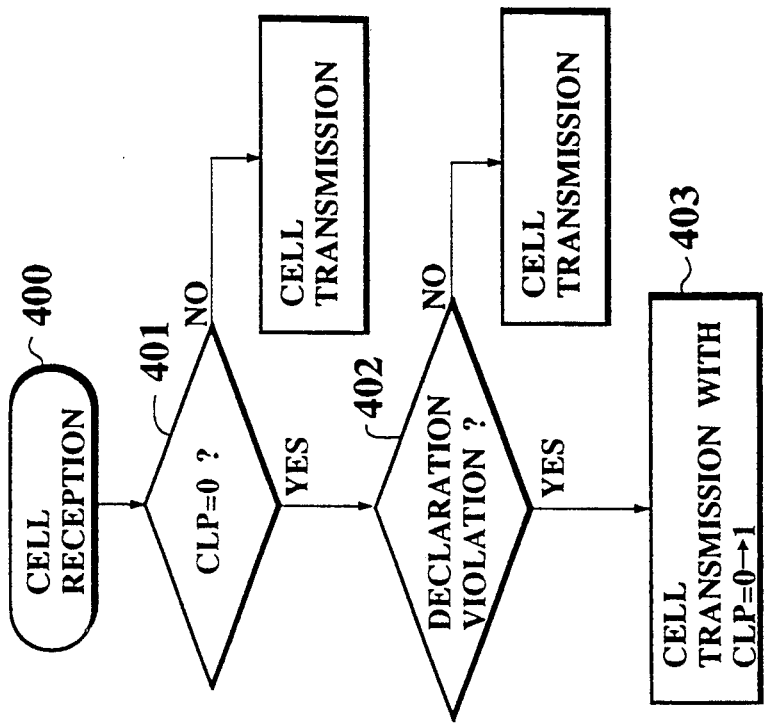

The usage parameter control algorithm for monitoring only the loss intolerable cells in this case is roughly shown in FIG. 11(A). Namely, when the cell is received at the step 300, a usage parameter control unit in the subscriber line interface checks the CLP values of the received cell and whether the received cell has CLP=0 or not is determined at the step 301. If no, the cell is the loss tolerable cell which is unconditionally transmitted, whereas otherwise next at the step 302, whether the cell is transmitted by violating the declaration or not is determined. If no, the cell is the non-violation loss intolerable cell which can be transmitted as it is, whereas otherwise next at the step 303, the cell is transmitted with the violation tag attached.

A third method is to change the bit value of the CLP field in the ATM cell header section of each violation cell from 0 indicating the loss intolerable status to 1 indicating the loss tolerable status.

In this method, similarly to the second method described above, at the subscriber line interface of the ATM exchange 25A carrying out the monitoring function, the bit values of the CLP fields in the ATM cell header sections of those loss intolerable cells which are judged to be the violation cells are changed from 0 to 1, and then transmitted to the ATM switch of the ATM exchange 25A.

Then, in a case a need for discarding of the cells arises at any one of the ATM exchanges 25A, 25B, and 25C, the network starts discarding the cells with CLP=1 first, before discarding any cell with CLP=0, so as to prevent the unfair deterioration of the cell loss rate for the non-violation loss intolerable cells.

The usage parameter control algorithm for monitoring only the loss intolerable cells in this case is roughly shown in FIG. 11(B). Namely, when the cell is received at the step 400, a usage parameter control unit in the subscriber line interface checks the CLP values of the received cell and whether the received cell has CLP=0 or not is determined at the step 401. If no, the cell is the loss tolerable cell which is unconditionally transmitted, whereas otherwise next at the step 402, whether the cell is transmitted by violating the declaration or not is determined. If no, the cell is the non-violation loss intolerable cell which can be transmitted as it is, whereas otherwise next at the step 403, the cell is transmitted with the CLP changed from 0 to 1.

Next, an embodiment based on a case (ii) of monitoring the loss intolerable cells and the loss tolerable cells separately will be described.

In this case, at a time of connection set up request, each terminal declares to the network the traffic characteristics for the loss intolerable cells (CLP=0) among the cells belonging to the virtual channel to be set up, as well as the traffic characteristic for the loss tolerable cells (CLP=1) among the cells belonging to the virtual channel to be set up. Then, while carrying out the connection admission control which secure the cell loss rates for the loss intolerable cells and the loss tolerable cells separately, the network also monitors whether the traffic characteristics for the loss intolerable cells and the loss tolerable cells for each virtual channel declared by each terminal at a time of the connection set up request are faithfully maintained or not.

When a terminal transmitting the cells by violating the declaration is detected, it must be regulated by the usage parameter control in order to prevent an adverse effect due to this violation on the cells of the other virtual channels which are not violating the declarations.

Such a usage parameter control can be realized by the following four methods.

A first method is to simply discard all the violation cells which are transmitted by violating the declaration, regardless of whether the cell is the loss intolerable cell or the loss tolerable cell. This method is quite simple and therefore practical, but it requires a very accurate algorithm for judging which cells are the violation cells. This is because it is quite undesirable for the network to irretrievably discard the cells which the terminal believes to have transmitted in accordance with the declaration, without any notice.

A second method is to discard the violation cells which are the loss tolerable cells (CLP=1), and to change the bit value of the CLP field in the ATM cell header section of each violation cell which is a loss intolerable cell (CLP=0) from 0 indicating the loss intolerable status to 1 indicating the loss tolerable status.

In this method, at the subscriber line interface of the ATM exchange 25A carrying out the monitoring function, the bit values of the CLP fields in the ATM cell header sections of those loss intolerable cells which are judged to be the violation are changed from 0 to 1, and then transmitted to the ATM switch of the ATM exchange 25A.

Then, in a case a need for discarding of the cells arises at any one of the ATM exchanges 25A, 25B, and 25C, the network starts discarding the cells with CLP=1 first, before discarding any cell with CLP=0. Here, if the violation cells are the loss intolerable cells (CLP=0), the number of the loss tolerable cells (CLP=1) will be increased from that declared after the CLP of the violation loss intolerable cells are changed, so that there is a possibility that the actually realized cell loss rate for the loss tolerable cells is greater than that supposed to be secured by the network. However, the cells to be discarded in this case will be predominantly the cells with CLP=1, so that the unfair deterioration of the cell loss rate for the non-violation loss intolerable cells can be prevented.

Figure 12:
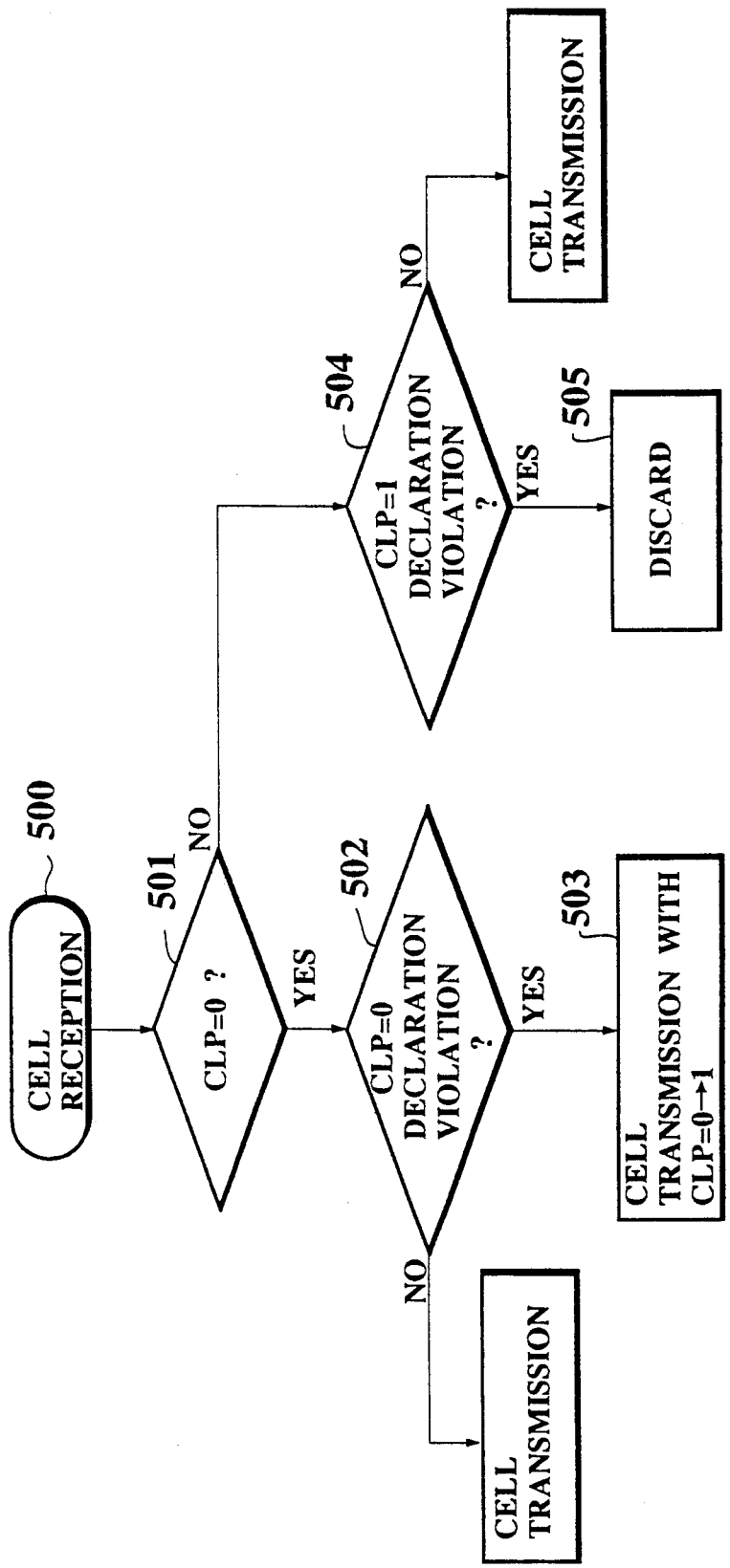
FIGS. 12(A), 12(B), and 12(C) are flow charts for three embodiments of a method of monitoring declaration violation in another type of the method of controlling data transmission in an ATM network according to the present invention.
Figure 12:
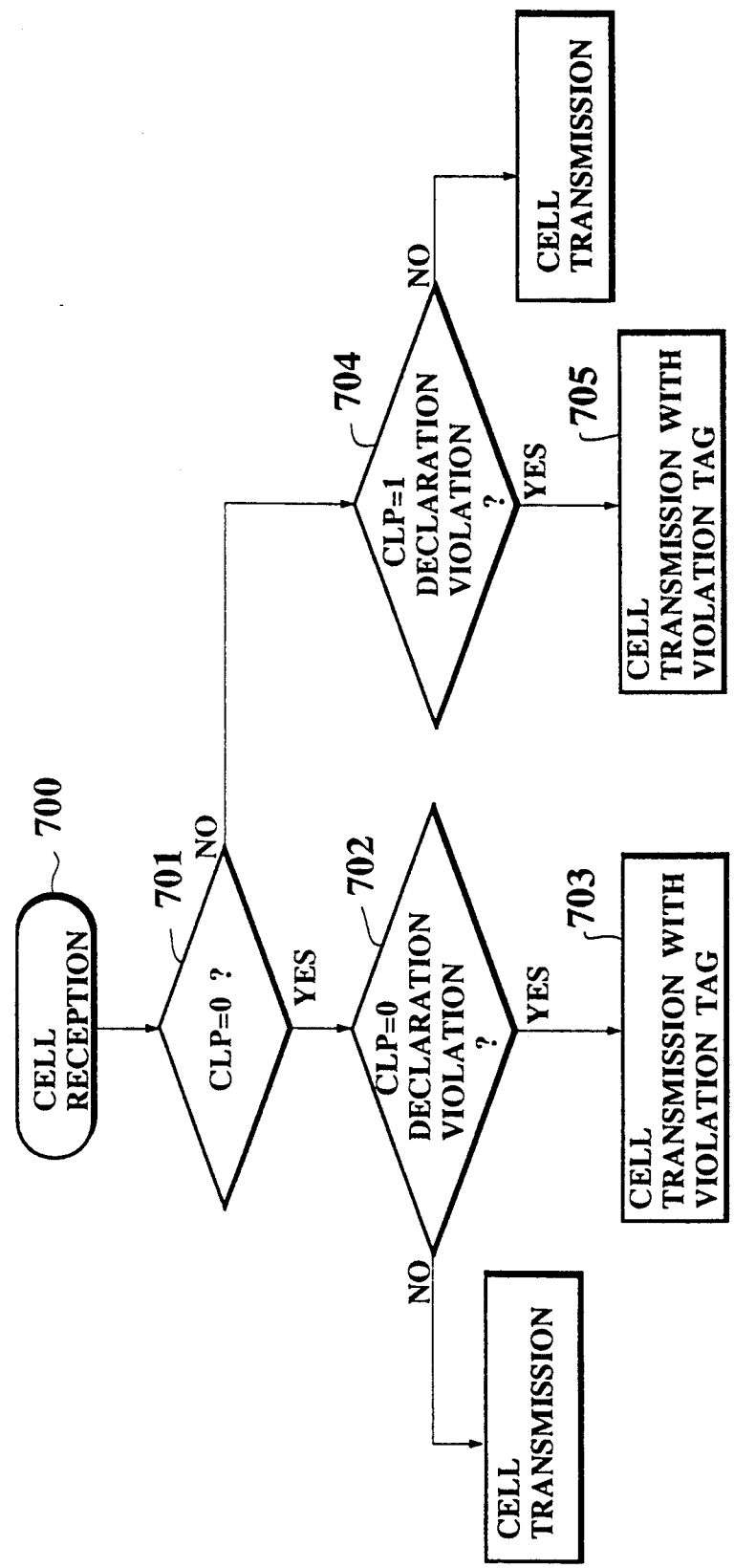

The usage parameter control algorithm for monitoring the loss intolerable cells and the loss tolerable cells separately in this case is roughly shown in FIG. 12(A). Namely, when the cell is received at the step 500, a usage parameter control unit in the subscriber line interface checks the CLP values of the received cell and whether the received cell has CLP=0 or not is determined at the step 501. If yes, next at the step 502, whether the cell is transmitted by violating the declaration or not is determined. If no, the cell is transmitted, whereas otherwise next at the step 503, the cell is transmitted with the CLP changed from 0 to 1. On the other hand, if the cell has CLP=1 at the step 501, next at the step 504, whether the cell is transmitted by violating the declaration or not is determined. If no, the cell is transmitted, whereas otherwise next at the step 505, the cell is discarded.

A third method is to discard the violation cells which are the loss tolerable cells (CLP=1), and to attach a violation tag indicating the violation cell to a field other than CLP, VPI, VCI, and HEC in the ATM cell header section, such as the PT field or the Res field for example, of each violation cell which is a loss intolerable cell (CLP=0). Thus, in this method, three types of cells including the cells with CLP=1, the cells with CLP=0 and the violation tags, and the cells with CLP=0 without the violation tag exist in the network.

In this method, at a subscriber line interface carrying out the monitoring function, the violation tags are attached to the PT fields or the Res fields in the ATM cell header sections of those loss intolerable cells which are judged to be the violation cells, and then transmitted to the ATM switch of the ATM exchange 25A.

Then, in a case a need for discarding of the cells arises at any one of the ATM exchanges 25A, 25B, and 25C, the network starts discarding the cells with CLP=0 and the violation tags first, and then the cells with CLP=1 (loss tolerable cells) next, before discarding any cell with CLP=0 without the violation tag, so as to prevent the unfair deterioration of the cell loss rates for the non-violation loss intolerable cells and the non-violation loss tolerable cells separately.

The usage parameter control algorithm for monitoring the loss intolerable cells and the loss tolerable cells separately in this case is roughly shown in FIG. 12(B). Namely, when the cell is received at the step 600, a usage parameter control unit in the subscriber line interface checks the CLP values of the received cell and whether the received cell has CLP=0 or not is determined at the step 601. If yes, next at the step 602, whether the cell is transmitted by violating the declaration or not is determined. If no, the cell is transmitted, whereas otherwise next at the step 603, the cell is transmitted with the violation tag attached. On the other hand, if the cell has CLP=1 at the step 601, next at the step 604, whether the cell is transmitted by violating the declaration or not is determined. If no, the cell is transmitted, whereas otherwise next at the step 605, the cell is discarded.

A fourth method is to attach a violation tag indicating the violation cell to a field other than CLP, VPI, VCI, and HEC in the ATM cell header section, such as the PT field or the Res field for example, of each violation cell, regardless of whether the cell is a loss intolerable cell (CLP=0) or a loss tolerable cell (CLP=1). Thus, in this method, four types of cells including the cells with CLP=1 and the violation tags, the cells with CLP=1 without the violation tag, the cells with CLP=0 and the violation tags, and the cells with CLP=0 without the violation tag exist in the network.

In this method, at a subscriber line interface carrying out the monitoring function, the violation tags are attached to the PT fields or the Res fields in the ATM cell header sections of those cells which are judged to be the violation cells, and then transmitted to the ATM switch of the ATM exchange 25A.

Then, in a case a need for discarding of the cells arises at any one of the ATM exchanges 25A, 25B, and 25C, the network starts discarding the cells in an order of the cells with CLP=1 and the violation tags first, the cells with CLP=0 and the violation tags next, the cells with CLP=1 without the violation tag next, and the cells with CLP=0 without the violation tag last, so as to prevent the unfair deterioration of the cell loss rates of the non-violation loss intolerable cells and the non-violation loss tolerable cells separately.

The usage parameter control algorithm for monitoring the loss intolerable cells and the loss tolerable cells separately in this case is roughly shown in FIG. 12(C). Namely, when the cell is received at the step 700, a usage parameter control unit in the subscriber line interface checks the CLP values of the received cell and whether the received cell has CLP=0 or not is determined at the step 701. If yes, next at the step 702, whether the cell is transmitted by violating the declaration or not is determined. If no, the cell is transmitted, whereas otherwise next at the step 703, the cell is transmitted with the violation tag attached. On the other hand, if the cell has CLP=1 at the step 701, next at the step 704, whether the cell is transmitted by violating the declaration or not is determined. If no, the cell is transmitted, whereas otherwise next at the step 705, the cell is transmitted with the violation tag attached.

Figure 13:
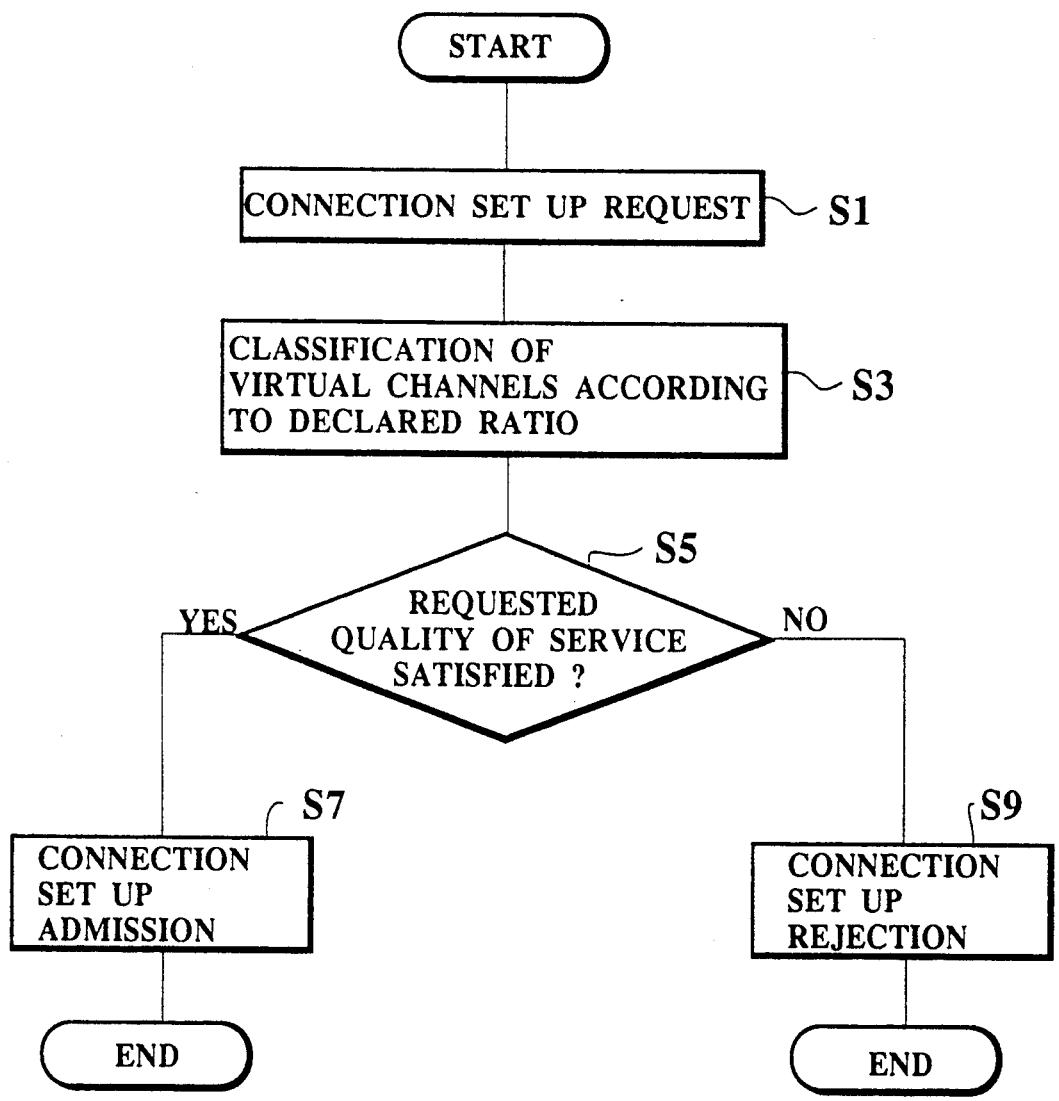
FIG. 13 is a flow chart for one embodiment of a method for controlling data transmission in an ATM network according to the present invention.

Referring now to FIG. 13, another embodiment of the method of controlling data transmission in such an ATM network incorporating the cell loss priority according to the present invention will be described in detail.

In this embodiment, at a time of connection set up request, each terminal declares to the network a ratio of numbers of the loss intolerable cells and the loss tolerable cells in each virtual channel to be set up, along with the other parameters to be declared.

Then, the network carries out the connection admission control according to a class of the declared ratio of numbers of the loss intolerable cells and the loss tolerable cells. Namely, the network divide the available communication resource into a plurality of mutually exclusive sub-resources in correspondence with a plurality of classes of the declared ratio, and carries out the connection admission control with respect to each of these sub-resources separately.

Hereafter, the description of this embodiment will be given for an exemplary case of a connection admission control for a certain class of cells, with the bandwidth as the communication resource.

Now, the ratio of numbers of the loss intolerable cells and the loss tolerable cells is denoted by r ($0 \leq a \leq r < b \leq 1$), i.e., r=(number of loss intolerable cells)/(number of loss intolerable cells+number of loss tolerable cells), where a and b are predetermined numbers and it is assumed that the cells for which r is between a and b are to be admitted.

The connection admission control in this case will be carried out according to the flow chart shown in FIG. 13, as follows.

First, at the step S1, the connection set up request is made from the terminal, and then in response, the connection is classified according to the declared ratio at the step S3. Next, at the step S5, the requested cell loss rate can be satisfied by the bandwidth allocated to the class of the connection determined at the step S3 even when the requested connection set up is admitted is judged. When it is judged to be possible to satisfy, the requested connection set up is admitted at the step S7, whereas when it is judged to be impossible to satisfy, the requested connection set up is rejected at the step S9.

Now, in this embodiment, at a time of connection set up request, each terminal is also supposed to request to the network a level of cell loss rate for the entire cells including the loss intolerable cells (CLP=0) and the loss tolerable cells (CLP=1) belonging to the virtual channel of the class to be set up. Here, there is a possibility for the loss intolerable cells to be discarded, but such a possibility is much smaller compared with the cell loss rate for the loss tolerable cells, so that it suffices to consider only the cell loss rate for the loss tolerable cells in discussing the cell loss rate for the entire cells. Hereinbelow, the cell loss rate for the loss tolerable cells in the multiplexed virtual channels is denoted by CLR1, while the cell loss rate for the loss intolerable cells in the multiplexed virtual channels is denoted by CLR0.

First, the cell loss rate for the entire cells including the loss intolerable cells (CLP=0) and the loss tolerable cells (CLP=1) belonging to the virtual channel of the class to be set up can be secured as follows.

In a case all the virtual channels of the class request the same cell loss rate, the connection admission control is carried out as follows. Here, it is assumed that the cell loss rate for the cells of each cell loss priority class can be estimated from the traffic characteristics for the cells of each cell loss priority class.

When the cell loss rate for the entire cells requested by the virtual channels of the class is CLR(REQ), the connection admission control is carried out such that the following equation (1) can be satisfied.

$$CLR(REQ) \geq CLR1 \times (1-a) \tag{1}$$

The worst possible cell loss rate for each virtual channel can be estimated as $CLR1 \times (1-a)$, so that the requested cell loss rate CLR(REQ) can be secured for all the virtual channels by carrying out the connection admission control according to the above equation (1).

It is to be noted that many modifications and variations of the above embodiments may be made without departing from the novel and advantageous features of the present invention. Accordingly, all such modifications and variations are intended to be included within the scope of the appended claims.

What is claimed is:

1. A method of controlling data transmission in an Asynchronous Transfer Mode (ATM) network, in which data are transmitted in units of cells, a group of cells are transmitted from a terminal to the network by setting up a virtual channel, and a plurality of virtual channels are multiplexed at the network, comprising the steps of:

providing a cell loss priority field in each cell to be transmitted with a cell loss priority level for distinguishing loss tolerable cells and loss intolerable cells, by a terminal;

declaring from the terminal to the network a traffic characteristic for the loss intolerable cells with a higher cell loss priority level in each virtual channel to be set up at a time of a connection set up request; and carrying out at the network a connection admission control by estimating a cell loss rate for the loss intolerable cells on a basis of the traffic characteristic declared at the declaring step, such that only the cell loss rate for the loss intolerable cells in the multiplexed virtual channels is secured by the network on a basis of the estimated cell loss rate for the loss intolerable cells.

2. The method of claim 1, further comprising the step of monitoring a traffic of the loss intolerable cells in each virtual channel in order to detect violation loss intolerable cells which are the loss intolerable cells transmitted in excess of the traffic characteristic declared at the declaring step.

3. The method of claim 2, further comprising the step of discarding the violation loss intolerable cells detected at the monitoring step.

4. The method of claim 2, further comprising the steps of:
attaching a violation tag to a cell header section of each of the violation loss intolerable cells detected at the monitoring step.

5. The method of claim 2, further comprising the steps of:
changing the cell loss priority level in a cell loss priority field of each of the violation loss intolerable cells detected at the monitoring step from a higher level to a lower level.

6. A method of controlling data transmission in an Asynchronous Transfer Mode (ATM) network, in which data are transmitted in units of cells, a group of cells are transmitted from a terminal to the network by setting up a virtual channel, and a plurality of virtual channels are multiplexed at the network, comprising the steps of:
providing a cell loss priority field in each cell to be transmitted with a cell loss priority level for distinguishing loss tolerable cells and loss intolerable cells, by a terminal;
declaring from the terminal to the network traffic characteristics for the loss intolerable cells with a higher cell loss priority level and the loss tolerable cells with a lower cell loss priority level in each virtual channel to be set up at a time of a connection set up request; and
carrying out at the network a connection admission control by estimating cell loss rates for the loss intolerable cells and the loss tolerable cells separately on a basis of the declared traffic characteristics, such that the cell loss rates for the loss intolerable cells and the loss tolerable cells in the multiplexed virtual channels are secured separately by the network on a basis of the estimated cell loss rates for the loss intolerable cells and the loss tolerable cells.

7. The method of claim 6, further comprising the step of monitoring a traffic of the loss intolerable cells and the loss tolerable cells in each virtual channel separately in order to detect violation cells which are the cells transmitted in excess of the traffic characteristic declared at the declaring step.

8. The method of claim 7, further comprising the steps of:
changing the cell loss priority level of each of the violation cells which are the loss intolerable cells detected at the monitoring step from a higher level to a lower level; and
discarding the violation cells which are the loss tolerable cells detected at the monitoring step.

9. The method of claim 7, further comprising the steps of:
attaching a violation tag to a cell header section of each of the violation cells which are the loss intolerable cells detected at the monitoring step; and
discarding the violation cells which are the loss tolerable cells detected at the monitoring step.

10. The method of claim 7, further comprising the steps of:
attaching a violation tag to a cell header section of each of all the violation cells detected at the monitoring step including the violation cells which are the loss intolerable cells and the violation cells which are the loss tolerable cells.

11. A method of controlling data transmission in an Asynchronous Transfer Mode (ATM) network, in which data are transmitted in units of cells, a group of cells are transmitted from a terminal to the network by setting up a virtual channel, and a plurality of virtual channels are multiplexed at the network, comprising the steps of:
providing a cell loss priority field in each cell to be transmitted with a cell loss priority level for distinguishing loss tolerable cells and loss intolerable cells, by a terminal;
declaring from the terminal to the network a ratio of numbers of the loss intolerable cells with a higher cell loss priority level and the loss tolerable cells with a lower cell loss priority level in each virtual channel to be set up at a time of a connection set up request;
classifying at the network the virtual channels into a plurality of virtual channel classes according to the ratio declared at the declaring step;
dividing at the network a communication resource into a plurality of sub-resources in correspondence with the plurality of the virtual channel classes; and
carrying out at the network a connection admission control for each of the virtual channel classes classified at the classifying step separately.

* * * * *